United States Patent
Uchida

(10) Patent No.: US 7,646,783 B2
(45) Date of Patent: Jan. 12, 2010

(54) ELECTRONIC DEVICE, IP ADDRESS DETERMINING METHOD, AND RECORDING MEDIUM HAVING IP ADDRESS DETERMINING PROGRAM STORED THEREIN

(75) Inventor: Takayuki Uchida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 552 days.

(21) Appl. No.: 11/365,508

(22) Filed: Mar. 2, 2006

(65) Prior Publication Data
US 2006/0215658 A1 Sep. 28, 2006

(30) Foreign Application Priority Data
Mar. 8, 2005 (JP) ............... 2005-064144

(51) Int. Cl.
H04L 12/56 (2006.01)
H04J 1/16 (2006.01)

(52) U.S. Cl. ............... 370/419; 370/386; 370/389
(58) Field of Classification Search ............... 370/392, 370/389, 386, 419
See application file for complete search history.

(56) References Cited

U.S. PATENT DOCUMENTS

| | | | | |
|---|---|---|---|---|
| 5,724,510 | A * | 3/1998 | Arndt et al. ............... | 709/220 |
| 7,376,745 | B2 * | 5/2008 | Shitano et al. ............... | 709/229 |
| 2001/0017856 | A1 * | 8/2001 | Asokan et al. ............... | 370/389 |
| 2001/0056499 | A1 | 12/2001 | Shirai et al. | |
| 2002/0172207 | A1 * | 11/2002 | Saito et al. ............... | 370/400 |
| 2003/0026230 | A1 | 2/2003 | Ibanez et al. | |
| 2003/0161332 | A1 | 8/2003 | Ohno et al. | |
| 2004/0139187 | A1 | 7/2004 | Park | |
| 2005/0254489 | A1 * | 11/2005 | Jain et al. ............... | 370/389 |

FOREIGN PATENT DOCUMENTS

| EP | 1 473 901 A2 | 11/2004 |
|---|---|---|
| JP | 2002-9823 | 1/2002 |
| JP | 2003-258825 | 9/2003 |

OTHER PUBLICATIONS

S. Thomson Bellcore, et al., "IPv6 Stateless Address Autoconfiguration", Network Working Group, Request for Comments: 2462, Obsoletes: 1971, Category: Standards Track, XP-015008246, Dec. 1998, pp. 1-25.

* cited by examiner

Primary Examiner—John Pezzlo
(74) Attorney, Agent, or Firm—Oblon, Spivak, McClelland, Maier & Neustadt, L.L.P.

(57) ABSTRACT

An electronic device is disclosed that generates an interface identifier to determine an IP address to use. The electronic device comprises an interface identifier generating unit to generate the interface identifier, a temporary IP address determining unit to determine a temporary IP address containing the interface identifier and a prefix, a duplication determining unit to determine whether the temporary IP address is the same as an IP address of another electronic device, and an IP address determining unit to specify the temporary IP address as the IP address to use, when the duplication determining unit determines that the temporary IP address is not the same as the IP address of another electronic device, wherein the interface identifier generating unit generates another interface identifier when the duplication determining unit determines that the temporary IP address is the same as the IP address of another electronic device.

15 Claims, 14 Drawing Sheets

ELECTRONIC DEVICE, IP ADDRESS DETERMINING METHOD, AND RECORDING MEDIUM HAVING IP ADDRESS DETERMINING PROGRAM STORED THEREIN

BACKGROUND OF THE INVENTION

1. Field of the Invention

The present invention relates to an electronic device that communicates using an IP address, an IP address determining method for use in the electronic device, and a recording medium having an IP address determining program stored therein.

2. Description of the Related Art

Transition of IP (Internet Protocol) address from 32-bit IPv4 address to 128-bit IPv6 address is underway. According to IPv6, as a unique link local address is assigned to each electronic device, users can communicate with other electronic devices right away by only connecting a cable without doing any configuration. Each link local address has a prefix and an interface identifier that is generated based on a MAC address (RFC2373).

<Patent Document 1> Japanese Patent Laid-Open Publication No. 2003-258825

<Patent Document 2> Japanese Patent Laid-Open Publication No. 2002-9823

<Patent Document 3> Japanese Patent Laid-Open Publication No. 2004-213067

However, if an electronic device with a manually assigned IP address or an electronic device with a fake MAC address is in the same segment as a user's device, the link local address of the user's device might be the same as the link local address of such a device. If there is such duplication of address, the user's device cannot communicate with other electronic devices.

SUMMARY OF THE INVENTION

The present invention may solve at least one problem described above.

According to an embodiment of the present invention, there are provided an electronic device capable of avoiding being unable to communicate with other electronic devices due to duplication of IP address, an IP address determining method, and a recording medium having an IP address determining program stored therein.

According to another aspect of the present invention, there is provided an electronic device that generates an interface identifier to determine an IP address to use, the device comprising an interface identifier generating unit to generate the interface identifier; a temporary IP address determining unit to determine a temporary IP address containing the interface identifier generated by the interface identifier generating unit and a prefix; a duplication determining unit to determine whether the temporary IP address determined by the temporary IP address determining unit is the same as an IP address of another electronic device; and an IP address determining unit to specify the temporary IP address as the IP address to use, when the duplication determining unit determines that the temporary IP address is not the same as the IP address of said another electronic device; wherein the interface identifier generating unit generates another interface identifier when the duplication determining unit determines that the temporary IP address is the same as the IP address of said another electronic device.

According to a further aspect of the present invention, there is provided an IP address determining method that generates an interface identifier to determine an IP address of an electronic device, the method comprising an interface identifier generating step of generating the interface identifier; a temporary IP address determining step of determining a temporary IP address containing the interface identifier generated in the interface identifier generating step and a prefix; a duplication determining step of determining whether the temporary IP address determined in the temporary IP address determining step is the same as an IP address of another electronic device; and an IP address determining step of specifying the temporary IP address as the IP address of the electronic device, when it is determined in the duplication determining step that the temporary IP address is not the same as the IP address of said another electronic device; wherein another interface identifier is generated in the interface identifier generating step when it is determined in the duplication determining step that the temporary IP address is the same as the IP address of said another electronic device.

According to still another aspect of the present invention, there is provided a recording medium having an IP address determining program stored therein for generating an interface identifier to determine an IP address of an electronic deice, the program causing a computer to execute an interface identifier generating process of generating the interface identifier; a temporary IP address determining process of determining a temporary IP address containing the interface identifier generated in the interface identifier generating process and a prefix; a duplication determining process of determining whether the temporary IP address determined in the temporary IP address determining process is the same as an IP address of another electronic device; and an IP address determining process of specifying the temporary IP address as the IP address of the electronic device, when it is determined in the duplication determining process that the temporary IP address is not the same as the IP address of said another electronic device; wherein another interface identifier is generated in the interface identifier generating process when it is determined in the duplication determining process that the temporary IP address is the same as the IP address of said another electronic device.

DETAILED DESCRIPTION OF THE PREFERRED EMBODIMENT

The following describes exemplary embodiments of the present invention with reference to the accompanying drawings. The IP addresses used in the following embodiments are IPv6 addresses.

Figure 1:
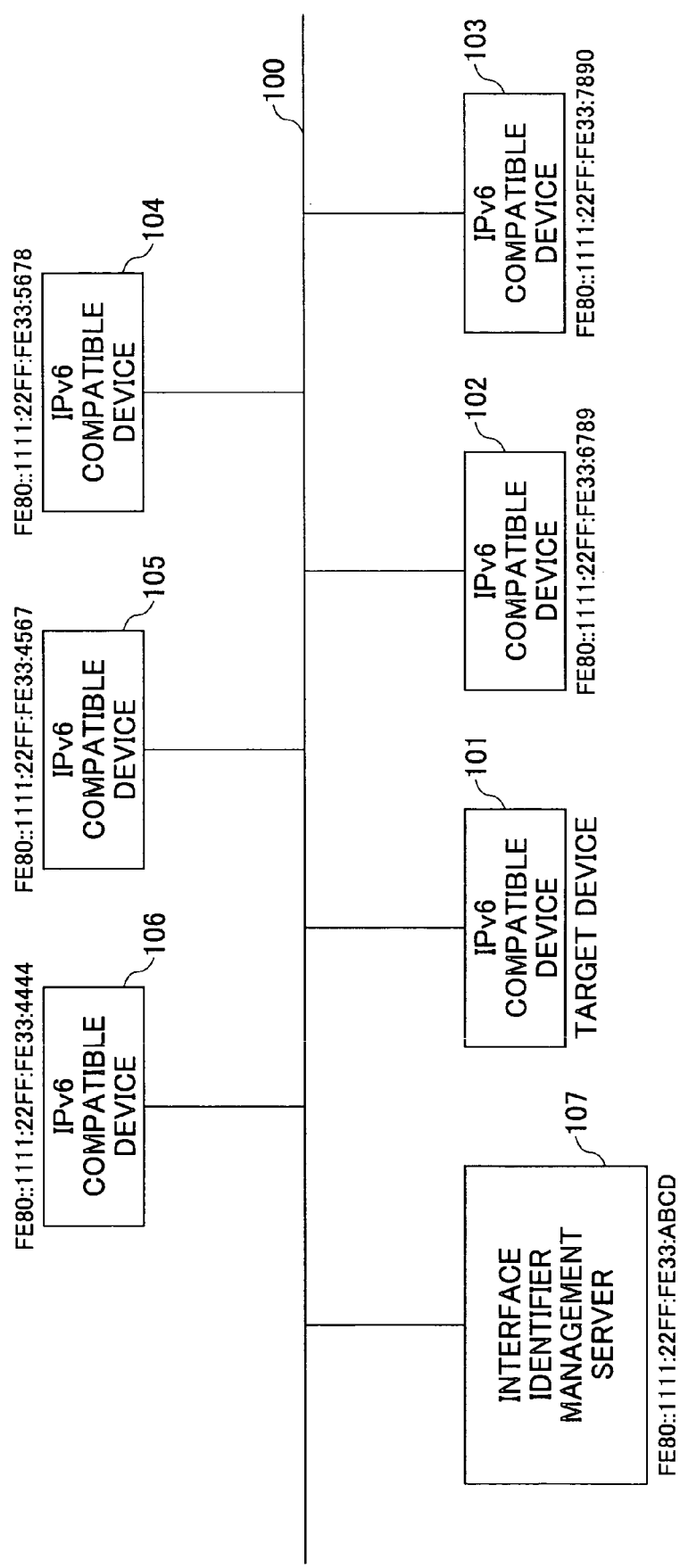
FIG. 1 shows a network configuration according to an embodiment of the present invention.

FIG. 1 shows a network configuration according to one embodiment of the present invention. Referring to FIG. 1, a network 100 interconnects a target device 101, an interface identifier management server 107, and IPv6 compatible devices 102-106.

The target device 101 is an electronic device that generates an interface identifier to determine an IP address to use. The IPv6 compatible devices 102-106 are IPv6 compatible electronic devices, such as personal computers and printers, located in the same segment as the target device 101. The interface identifier management server 107 provides the target device 101 with an interface identifier. That is, the interface identifier of the target device 101 may be generated by the interface identifier management server 107 provided outside the target device 101.

Figure 2:
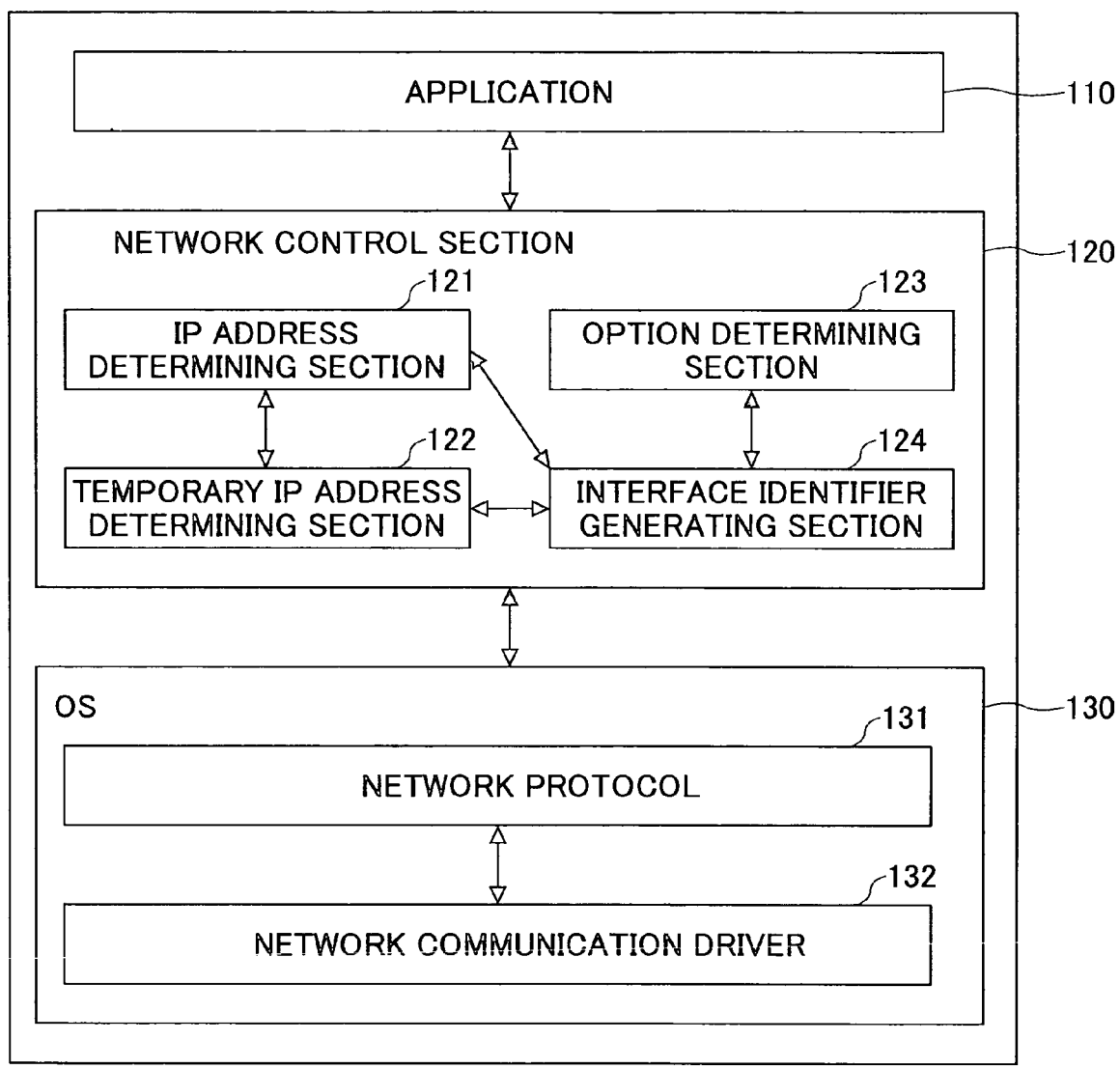
FIG. 2 is a block diagram illustrating a software configuration of a target device.

FIG. 2 shows a software configuration of the target device 101. The target device 101 comprises an application 110, a network control section 120, and an OS 130.

The application 110 is used by users for configuration setting described below, and displays information to the users. The network control section 120 includes an IP address determining section 121, a temporary IP address determining section 122, an option determining section 123, and an interface identifier generating section 124.

The interface identifier generating section 124 generates an interface identifier. The temporary IP address determining section 122 determines a temporary IP address containing the interface identifier generated by the interface identifier generating section 124 and a prefix. The IP address determining section 121 specifies the temporary IP address as the IP address to be used by the target device 101 when it is determined that the temporary IP address is not the same as an IP address of another electric device. Such a temporary IP address specified as the IP address of the target device 101 may also be referred to as an alternative IP address in the following description.

The option determining section 123 determines whether an alternative IP address option is enabled when there is duplication of IP address. The alternative IP address option is for specifying a temporary IP address that is not the same as the IP address of another electronic device as the IP address of the target device 101.

When the alternative IP address option is enabled, a process of specifying the temporary IP address that is not used by other devices as the IP address of the target device 101 is performed if there is duplication of IP address. When the alternative IP address option is disabled, the target device 101 cannot communicate with other devices if there is duplication of IP address.

The IP address used herein is any one of a link local address, a stateless address, and a stateful address.

The OS 130 includes a network protocol 131 and a network communication driver 132. The network protocol 131 performs protocol control. The network communication driver 132 determines whether there is duplication of IP address, more specifically, whether the temporary IP address determined by the temporary IP address determining section 122 is the same as the IP address of another electronic device. If the network communication driver 132 determines that the temporary IP address is the same as the IP address of another electronic device, the interface identifier generating section 124 generates another interface identifier. Generation of interface identifiers continues until it is determined that there is no duplication. The generation of iterance identifiers by the interface identifier generating section 124 is described below in greater detail.

Figure 3:
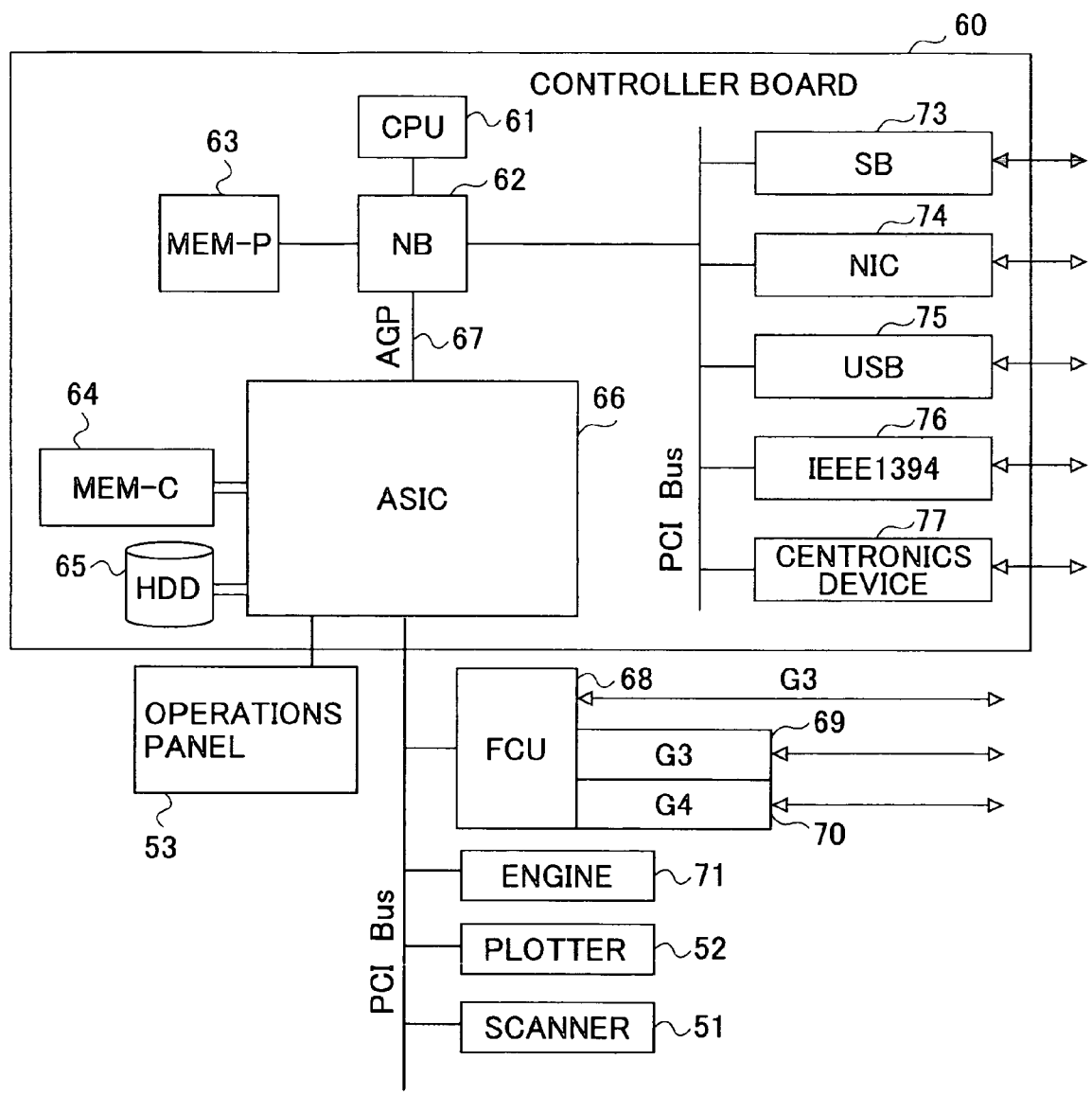
FIG. 3 is a block diagram illustrating a hardware configuration of a target device.

FIG. 3 shows a hardware configuration of a MFP (Multi Function Printer) as an example of the target device 101. The MFP comprises a controller board 60, an operations panel 53, an FCU 68, an engine 71, a scanner 51, and a plotter 52. The FCU 68 includes a G3 compatible unit 69, and a G4 compatible unit 70.

The controller board 60 includes a CPU 61, an ASIC 66, an HDD 65, a local memory (MEM-C) 64, a system memory (MEM-P) 63, a north bridge (NB) 62, a south bridge (SB) 73, a network interface card (NIC) 74, a USB device 75, an IEEE1394 device 76, and a Centronics device 77.

The operations panel 53 is connected to the ASIC 66 of the controller board 60. The SB 73, the NIC 74, the USB device 75, the IEEE1394 device 76, and the Centronics device 77 are connected to the NB through a PCI bus.

The FCU 68, the engine 71, the scanner 51, and the plotter 52 are connected to the ASIC 66 of the controller board 60 through a PCI bus.

In the controller board 60, the ASIC 66 is connected to the local memory 64 and the HDD 65, etc., and also connected to the CPU 61 through the NB 62 as a CPU chipset. The ASIC 66 and the CPU 61 are connected through the NB 62 in case that the interface of the CPU 61 is not disclosed.

The ASIC 66 and the NB 62 are connected, not through a PCI bus, but through an Accelerated Graphics Port (AGP) 67. As the ASIC 66 and the NB 62 are connected, not through a PCI bus, but through an Accelerated Graphics Port (AGP) 67, one or more processes can be controlled and performed without lowering the performance.

The CPU 61 controls the MFP. The CPU 61 starts and runs programs, as processes, on the OS.

The NB 62 is a bridge connected to the CPU 61, the system memory 63, the SB 73, and the ASIC 66. The system memory 63 is used as an image drawing memory of the MFP, for example. The SB 73 is a bridge connected to the NB 62, the PCI Bus, and peripheral devices. The local memory 64 is used as a copy image buffer and a code buffer.

The ASIC 66 is an image processing IC that includes a hardware element for image processing. The HDD 65 is a storage unit for storing image data, document data, programs, font data, and forms. The operations panel 53 serves as an operations section to receive input from users and to display information to users.

Figure 4:
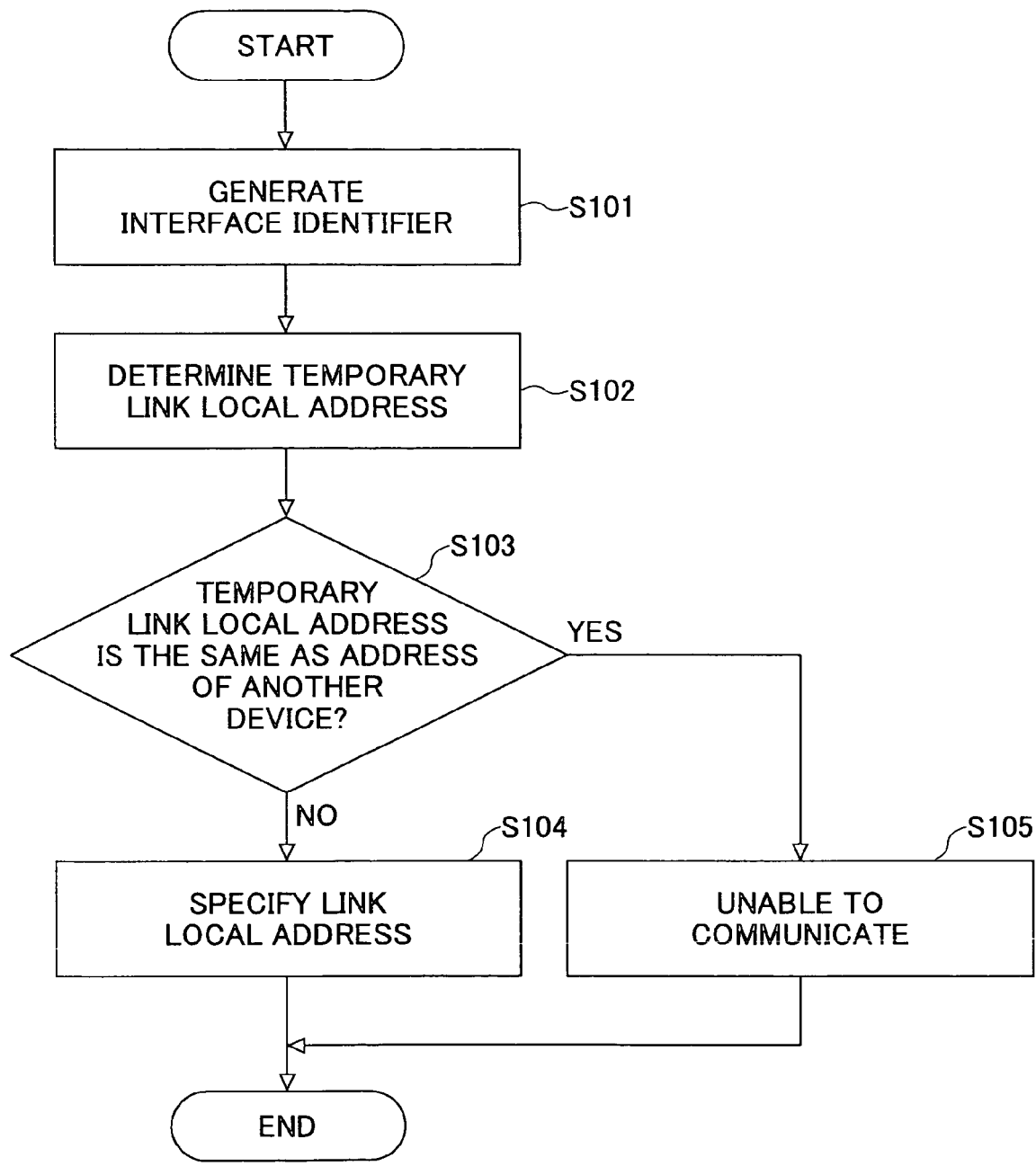
FIG. 4 is a flowchart illustrating an automatic configuration process.

FIG. 4 is a flowchart illustrating an IPv6 automatic configuration process in the target device 101. In Step S101, the interface identifier generating section 124 generates an interface identifier based on a MAC address (RFC2373). In step S102, the temporary IP address determining section 122 determines a temporary link local address by combining a 64-bit prefix FE80::0 with the low 64-bit interface identifier, thereby determining a temporary IPv6 address.

Then in step S103, the network communication driver 132 sends neighbor solicitations (multicasts a query utilizing an ICMP message) to other devices in the same segment in order to determine whether the temporary link local address is the same as an IPv6 address of another device. If no response to the neighbor solicitations is received from other devices, the IP address determining section 121 specifies the temporary link local address as the link local address of the target device 101 in step S104. If a response is received from one of the other devices (neighbor advertisement) indicating that its IPv6 address is the same as the temporary link local address, no link local address is assigned to the target device 101 in step S105. Since no link local address is assigned to the target device 101, the target device 101 cannot communicate with the other devices.

Figure 5:
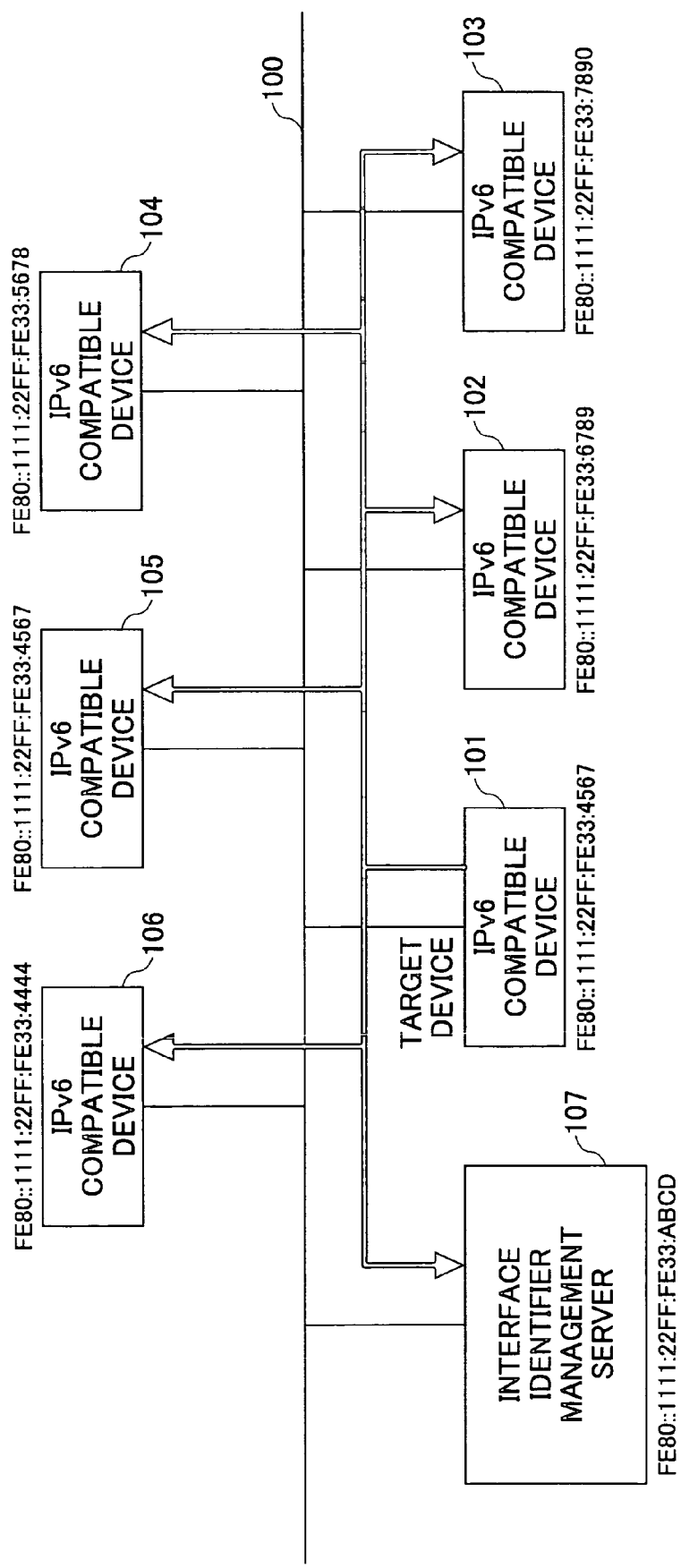
FIG. 5 illustrates neighbor solicitation.

The following describes the neighbor solicitation in greater detail. FIG. 5 illustrates the target device 101 sending the neighbor solicitations to all the IPv6 compatible devices 102-106 and the interface identifier management server 107 in the same segment.

Figure 6:
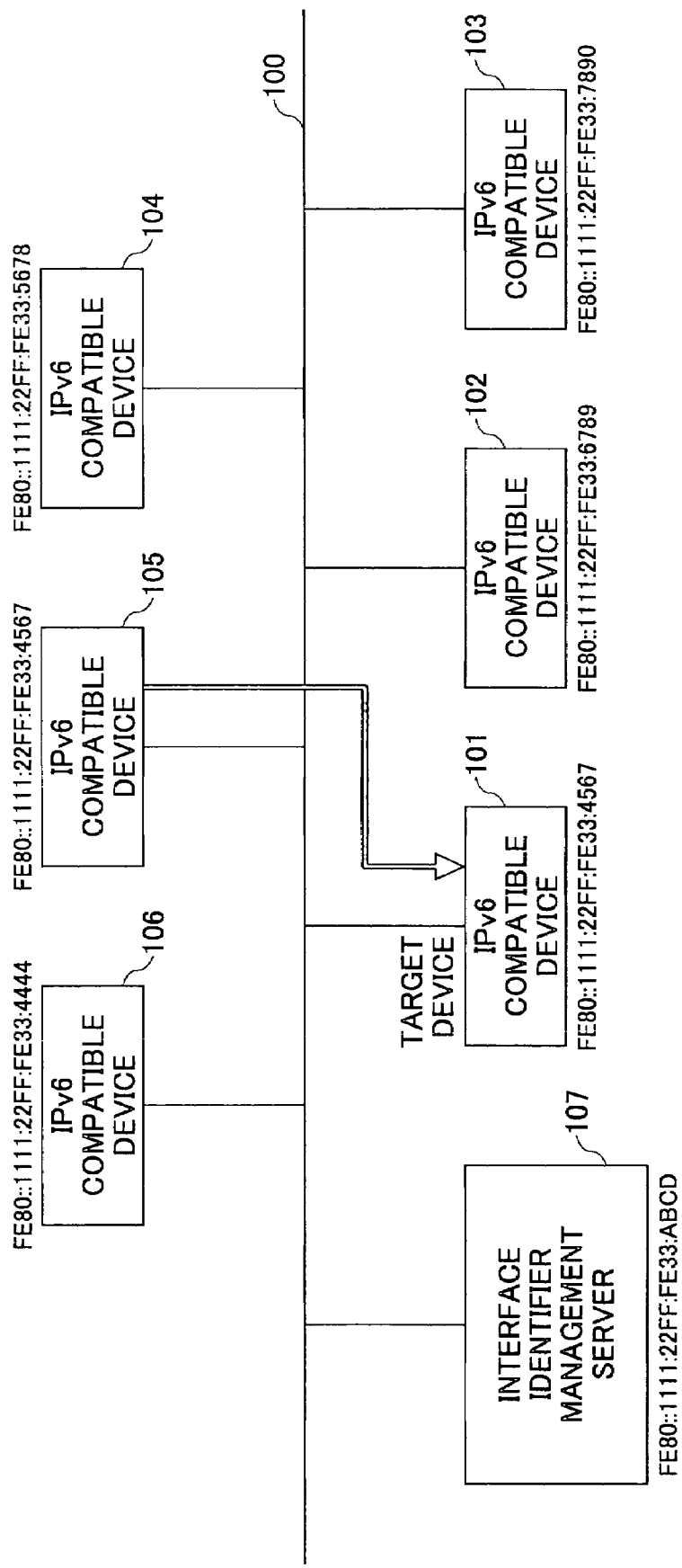
FIG. 6 illustrates neighbor advertisement.

If, for example, the IP address of the IPv6 compatible device 105 is the same as the IP address of the target device 101, the IPv6 compatible device 105 sends a neighbor advertisement to the target device 101 as shown in FIG. 6. According to related-art methods, the target device 101 becomes unable to communicate with the devices 102-106 and the server 107 at this moment when duplication of the link local address is detected.

Figure 7:
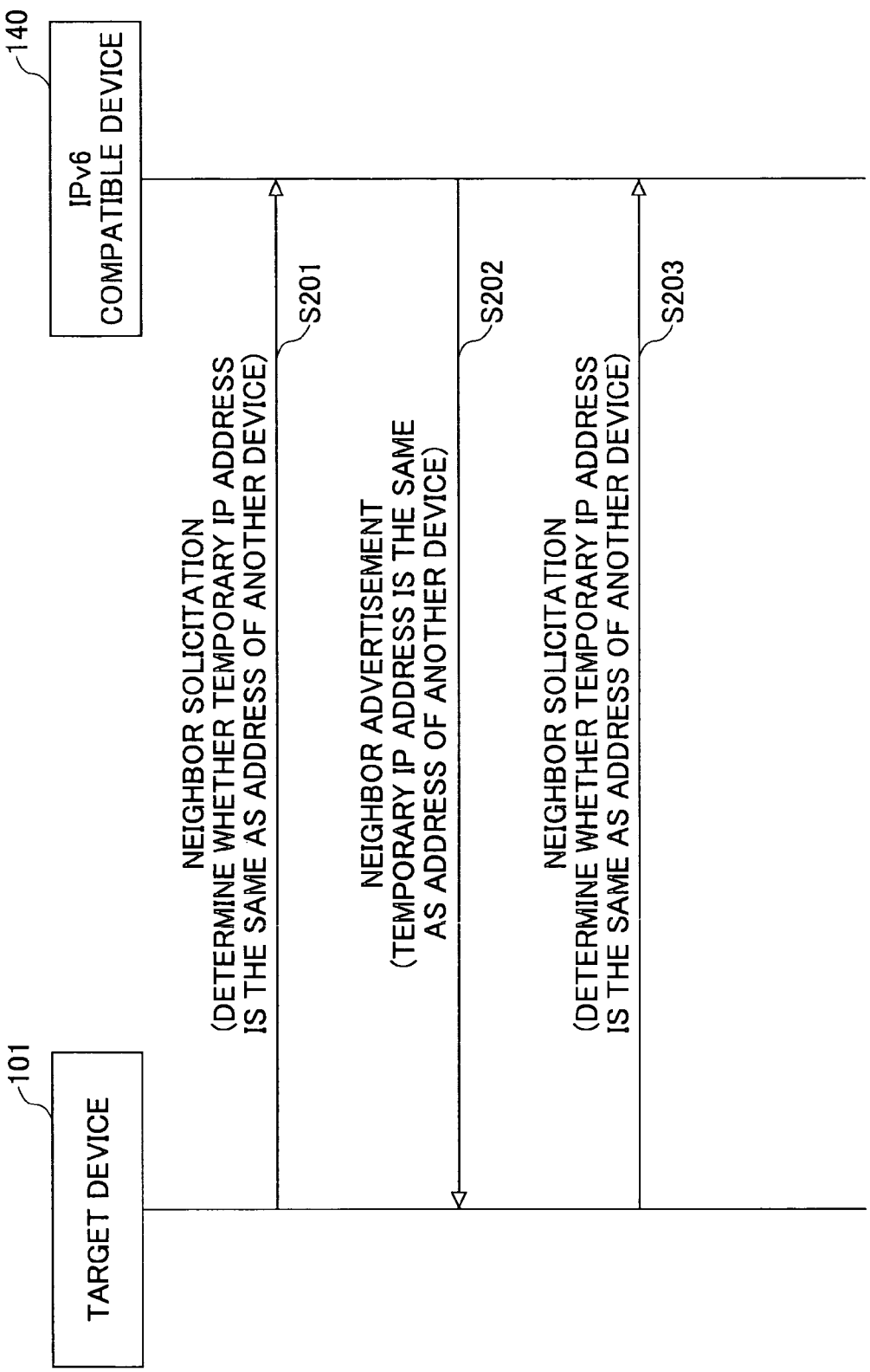
FIG. 7 is a sequence diagram illustrating a basic process according to an embodiment of the present invention.

On the other hand, in the present embodiment, a process shown in the sequence diagram of FIG. 7 is performed. Referring to the sequence diagram of FIG. 7, the target device 101 sends the neighbor solicitations to the other devices in the same segment in step S201. If there is an IPv6 compatible device 140 whose IP address is the same as the temporary IP address of the target device 101, a neighbor advertisement is sent from the IPv6 compatible device 140 to the target device 101 in step S202. Then in Step S203, the target device 101 determines another temporary IP address and sends neighbor solicitations again.

This process is repeated until no neighbor advertisement is sent to the target device 101 anymore. Thus, the target device 101 is prevented from being unable to communicate the other devices due to duplication of the IP address.

Figure 8:
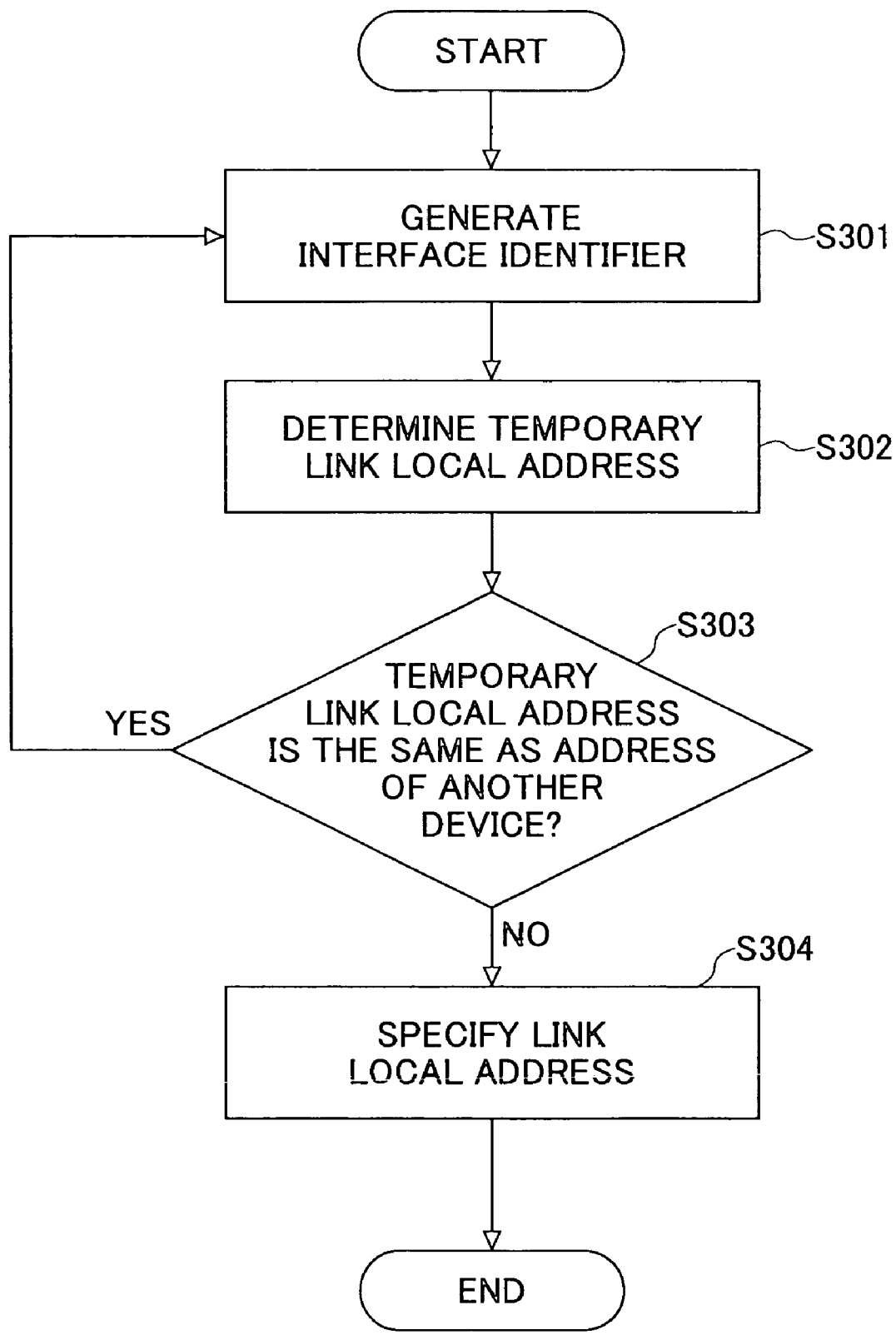
FIG. 8 is a flowchart showing a process of specifying an alternative IP address as an IP address.

FIG. 8 is a flowchart illustrating a process of specifying an alternative IP address as the IP address of the target device 101. In Step S301 (interface identifier generating step), the interface identifier generating section 124 generates an interface identifier based on a MAC address (RFC2373). In step S302 (temporary IP address determining step), the temporary IP address determining section 122 determines a temporary link local address by combining a 64-bit prefix FE80::0 with the low 64-bit interface identifier, thereby determining a temporary IPv6 address.

Then in step S303 (duplication determining step), the network communication driver 132 sends neighbor solicitations in order to determine whether the temporary link local address is the same as an address of another device. If no response to the neighbor solicitations is received from other devices, the IP address determining section 121 specifies the temporary link local address as the link local address of the target device 101 in step S304. If a neighbor advertisement is received from one of the other devices, the interface identifier generating section 124 generates another interface identifier again in step S301.

There are some methods to generate the interface identifier. One method is to generate the interface identifier by inserting values excluding FFFE between high 24 bits and low 24 bits of a MAC address. Since FFFE are generally inserted between the high 24 bits and the low 24 bits, this method is effective when there is an electronic device with a fake MAC address in the same segment.

Another method is to generate the interface identifier using the interface identifier management server 107 provided outside the target device 101. The interface identifier management server 107 manages interface identifiers of IP addresses used in the same segment. According to this method, an interface identifier that does not have the same interface identifier in those managed by the interlace identifier management server 107 is provided from the interface identifier management server 107.

There is a further method that generates the interface identifier using a hash function. This method uses a hash function as a random number generator function.

Figure 9:
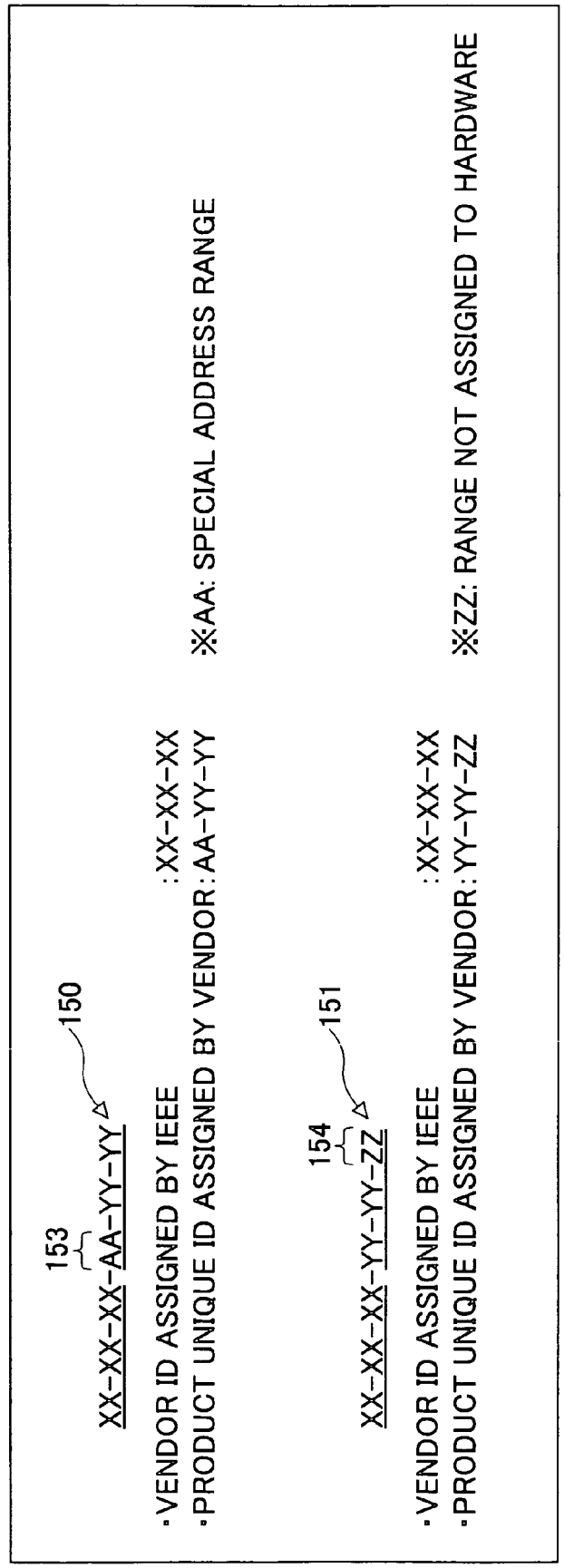
FIG. 9 illustrates an interface identifier generating method.

Still another generating method is described with reference to a MAC address 150 shown in FIG. 9. In the MAC address 150, "AA" with one-byte length is a special address range 153 for a vendor. According to this method, the interface identifier is generated by changing the special address range 153 for a vendor.

A further generating method is described with reference to another MAC address 151 shown in FIG. 9. In the MAC address 151, "ZZ" with one-byte length are values in a range 154 not assigned to hardware by a vendor. According to this method, the interface identifier is generated by changing the values in the range 154 not assigned to hardware by a vendor.

In this embodiment, users may select which one of the above-described generating methods to be used.

Figure 10:
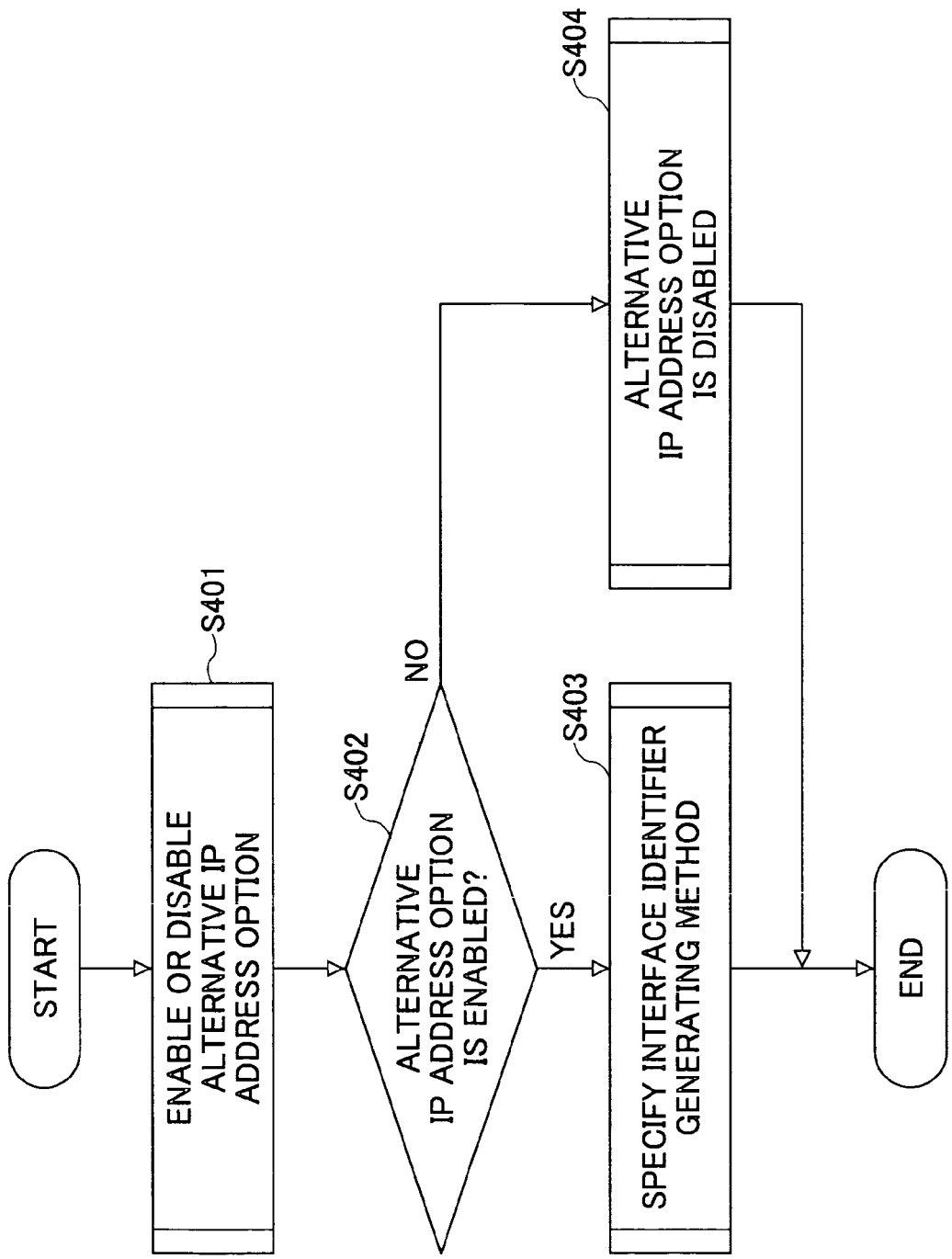
FIG. 10 is a flowchart showing a process of setting an alternative IP address option.

The following describes a process of setting the alternative IP address option with reference to the flowchart of FIG. 10. In step S401, the alternative IP address option is enabled or disabled in the application 110.

In step S402, the option determining section 123 determines whether the alternative IP address option is enabled. If the option is enabled, the option determining section 123 specifies one of the above-described interface identifier generating methods in step S403. If the option is disabled, the option determining section 123 leaves the option disabled in step S404.

Figure 11:
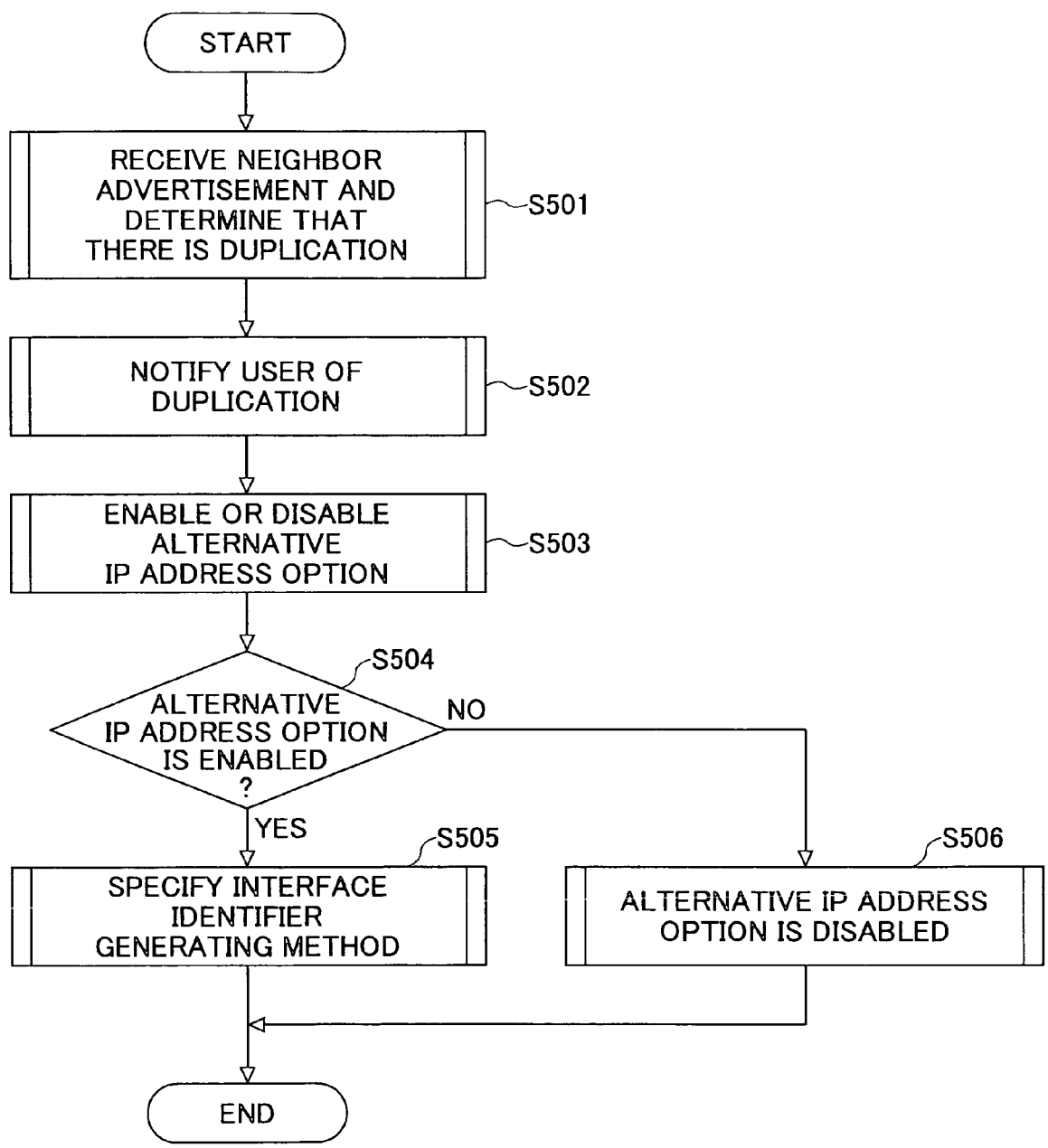
FIG. 11 is a flowchart showing a process of enabling an alternative IP address option afterwards.

This process is for setting the alternative IP address option in advance. FIG. 11 shows a process of setting the alternative IP address option after duplication of IP address is detected.

In step S501, the network communication driver 132 receives a neighbor advertisement and determines that there is duplication. In step S502, a user is notified of the duplication. Steps S503-S506 that follow are the same as Steps S401-S404 and hence not described here.

In this way, if the alternative IP address option is not set in advance, the alternative IP address can be set after duplication is detected. If the alternative IP address option is enabled in advance, a screen 160 illustrated in FIG. 12 appears upon determining that an original IP address 171 of the target device 101 is the same as an address of another device.

Figure 12:
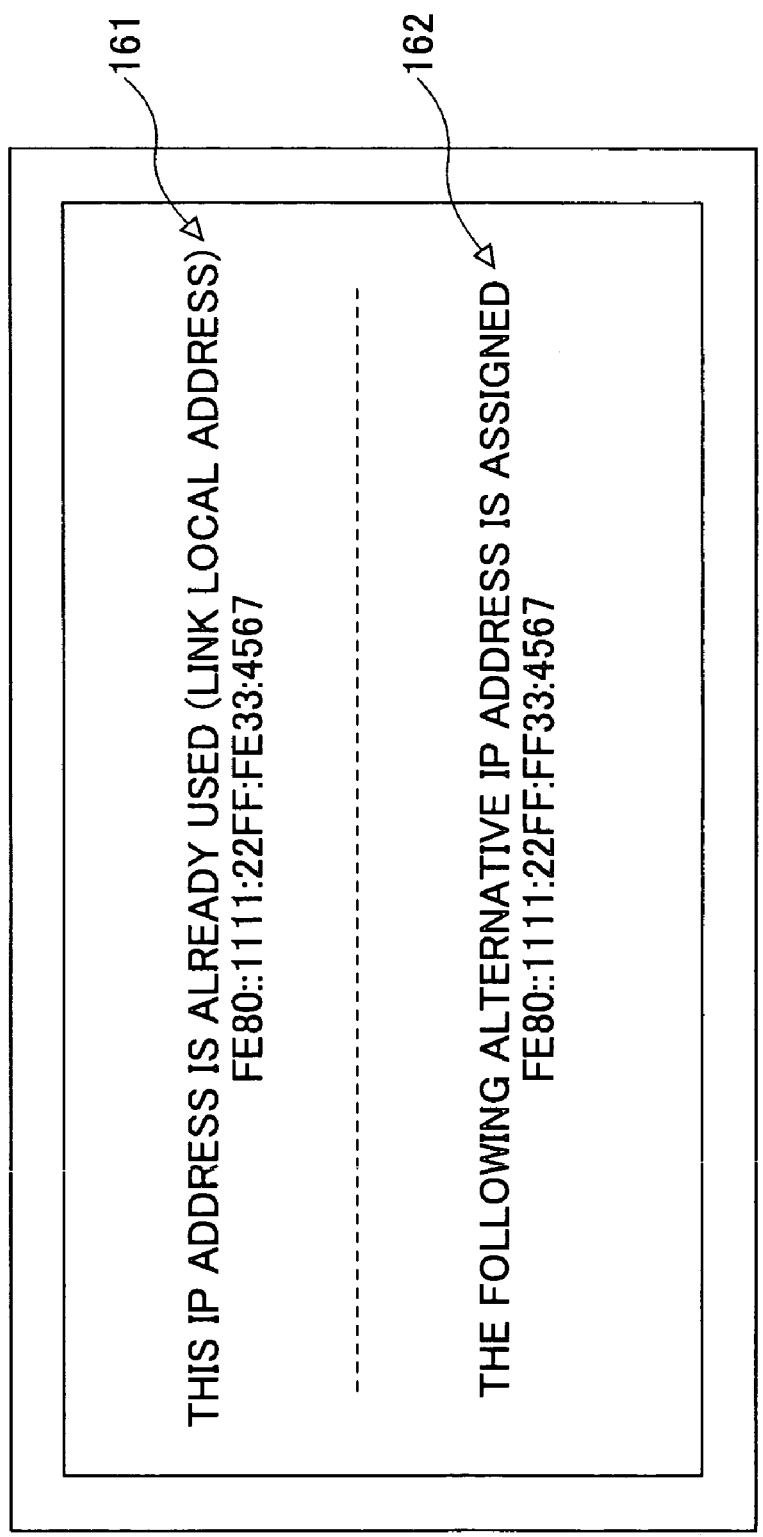
FIG. 12 illustrates a screen that appears when an alternative IP address option is enabled in advance.

The screen 160 of FIG. 12 shows an original IP address 161 of the target device 101 and an alternative IP address 162. In this example of FIG. 12, the original IP address 161 (FE80::1111:22FF:FE33:4567) and the type of the IP address (link local address) are displayed. The alternative IP address 162 (FE80::1111:22FF:FF33:4567) is also displayed.

This screen 160 shows not only the original IP address but also the alternative IP address 162 because the alternative IP address option is enabled in advance.

Figure 13:
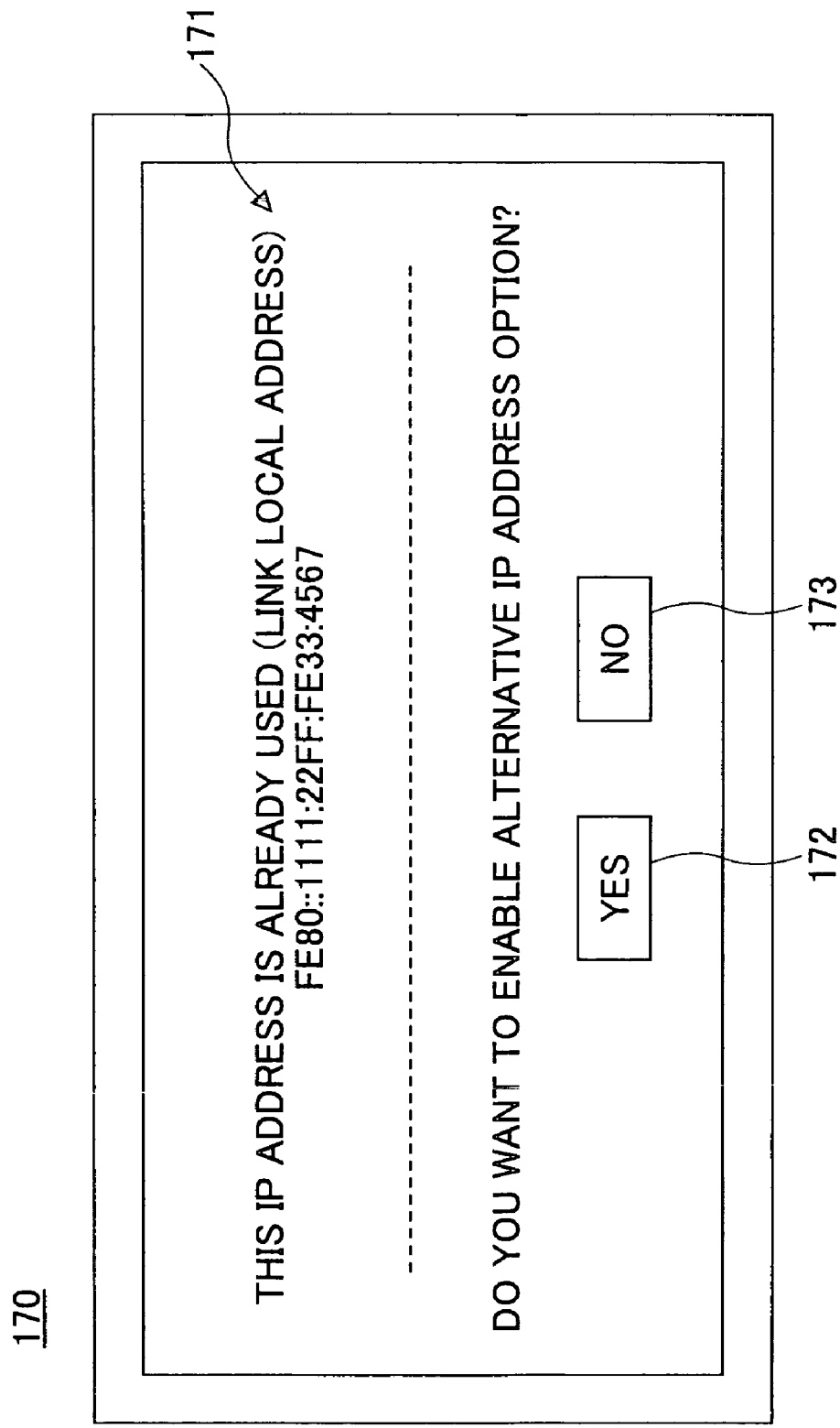
FIG. 13 illustrates a screen used for selecting afterwards whether to enable an alternative IP address option.

If the alternative IP address option is not set in advance, a screen 170 illustrated in FIG. 13 appears upon determining that an original IP address 171 of the target device 101 is the same as an address of another device. The screen 170 displays the original IP address 171 and buttons 172 and 173.

A user can select whether to enable the alternative IP address option using the buttons 172 and 173. If the user selects the button 172, the alternative IP address option is enabled.

Figure 14:
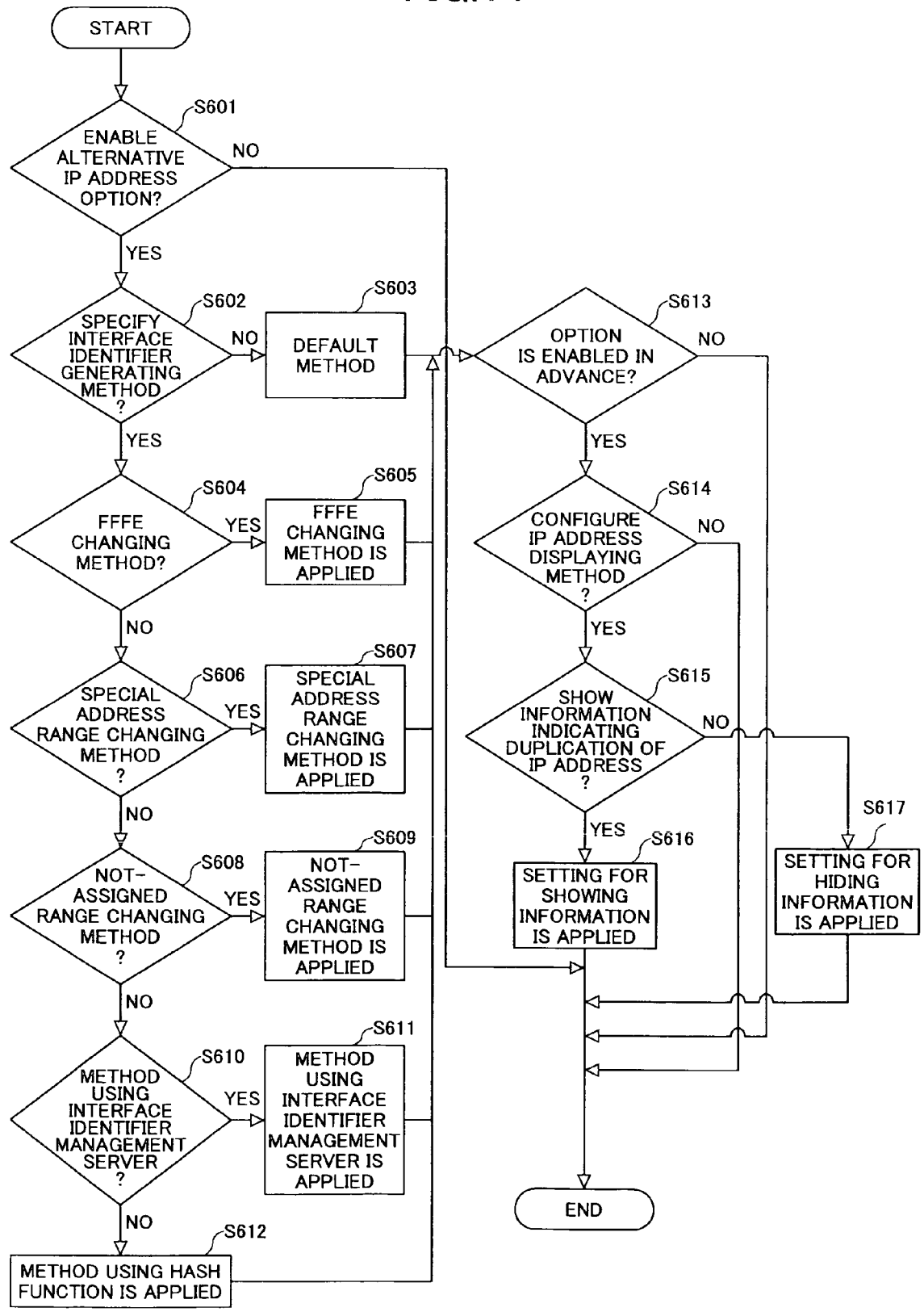
FIG. 14 is a flowchart showing a process of specifying an interface identifier generating method.

FIG. 14 is a flowchart showing a process of specifying an interface identifier generating method used in the alternative IP address option. In step S601, it is determined whether to enable the alternative IP address option. If the option is not enabled, the process is ended. If the option is enabled, it is determined whether to specify an interface identifier generating method in step S602. If the method is not specified, a default method is applied in step S603. Then, the processing proceeds to step S613. The default method is one of the above-described generating methods, for example.

If, on the other hand, the interface generating method is specified in step S602, it is determined whether the method of generating an interface identifier by changing FFFE is specified as the interface identifier generating method in step S604. If the method of generating an interface identifier by changing FFFE is specified, this method is applied in step S605. Then the processing proceeds to step S613.

If, on the other hand, the method of generating an interface identifier by changing FFFE is not specified in step S604, it is determined whether the method of generating an interface identifier by changing values in the special address range is specified as the interface identifier generating method in step S606. If the method of generating an interface identifier by changing values n the special address range is specified, this method is applied in step S607. Then the processing proceeds to step S613.

If, on the other hand, the method of generating an interface identifier by changing values in the special address range is not specified in step S606, it is determined whether the method of generating an interface identifier by changing values in the range not assigned to hardware is specified as the interface identifier generating method in step S608. If the method of generating an interface identifier by changing values in the range not assigned to hardware is specified, this method is applied in step S609. Then the processing proceeds to step S613.

If, on the other hand, the method of generating an interface identifier by changing values in the range not assigned to hardware is not specified in step S608, it is determined whether the method of generating an interface identifier using the interface identifier management server 107 as the interface identifier generating method in step S610. If the method of generating an interface identifier using the interface identifier management server 107 is specified, this method is applied in step S611. Then the processing proceeds to step S613.

If, on the other hand, the method of generating an interface identifier using the interface identifier management server 107 is not specified in step S610, the method of generating an interface identifier using a hash function is applied in step S612. Then the processing proceeds to step S613.

In step S613, it is determined whether the alternative IP address option is enabled in advance. If the option is not enabled in advance, the process is ended. If the option is enabled in advance, it is determined whether to configure an alternative IP address displaying method in step S614. Configuring the displaying method means selecting whether to display information indicating duplication of IP address on the operations panels. If the displaying method is not to be configured, the process is ended. If, on the other hand, the displaying method is to be configured, it is determined whether to show the information indicating duplication of IP address on the operations panel 53 in step S615. To show the information, a setting for showing the information is applied in step S616. To not show the information, a setting for hiding the information is applied in step S617.

According to the above embodiment, if the alternative IP address option is enabled in advance, another alternative IP address can be used quickly without going through the application 110 upon detection of duplication of IP address. If the alternative IP address option is enabled after the detection of the duplication of IP, another alternative IP address is used after going through the application 110. Therefore, longer time is required compared to the case where the option is enabled in advance. However, since a user selects whether to enable the alternative IP address option after detecting the duplication IP address, the user can know whether there is an unauthorized device in the same segment. If the option is enabled after the duplication of IP address is detected, the alternative IPv6 address may be generated at any time the user wishes.

The present application is based on Japanese Priority Application No. 2005-064144 filed on Mar. 8, 2005, with the Japanese Patent Office, the entire contents of which are hereby incorporated by reference.

What is claimed is:

1. An electronic device including a processor that generates an interface identifier to determine an IP address to use, comprising:

an interface identifier generating unit configured to generate the interface identifier using a server based identifier management generating unit or a local interface identifier unit;

a temporary IP address generating unit configured to generate a temporary IP address containing the interface identifier generated by the interface identifier generating unit and a prefix;

a duplication determining unit configured to determine whether the temporary IP address generated by the temporary IP address generating unit is the same as an IP address of another electronic device; and an IP address determining unit configured to specify the temporary IP address as the IP address to use, when the duplication determining unit determines that the temporary IP address is not the same as the IP address of said another electronic device;

wherein when the duplication determining unit determines that the temporary IP address is the same as the IP address of said another electronic device, the interface identifier generating unit generates another interface identifier by using the local interface identifier unit for a pre-determined number of attempts, when the pre-determined number of attempts is reached, the interface identifier generating unit generates the another interface identifier by using the server based identifier management generating unit, and wherein the another interface identifier generated by local interface identifier unit is generated using a MAC address of the electronic device in which values excluding FFFE are inserted between high 24 bits and low 24 bits.

2. The electronic device as claimed in claim 1, wherein the interface identifier is generated by the interface identifier generating unit using a hash function.

3. The electronic device as claimed in claim 1, wherein the interface identifier is generated by the interface identifier generating unit using a server provided outside the electronic device.

4. The electronic device as claimed in claim 1, wherein the interface identifier is generated by the interface identifier generating unit using a MAC address of the electronic device in which values in a special address range for a vendor are changed.

5. The electronic device as claimed in claim 1, wherein the interface identifier is generated by the interface identifier generating unit using a MAC address of the electronic device in which values in a range not assigned to hardware by a vendor are changed.

6. The electronic device as claimed in claim 1, wherein the interface identifier is generated by the interface identifier generating unit according to an interface identifier generating method selected by a user.

7. The electronic device as claimed in claim 1, wherein the IP address is any one of a link local address, a stateless address, and a stateful address.

8. An IP address generating method of generating an interface identifier to determine an IP address of an electronic device using a computer, the method comprising:

generating an interface identifier using a server based identifier management generating unit or a local interface identifier unit;

generating, using the computer, a temporary IP address containing the interface identifier, generated in the step of generating an interface identifier, and a prefix;

determining whether the temporary IP address, generated in the step of generating a temporary IP address, is the same as an IP address of another electronic device; and specifying the temporary IP address as the IP address of the electronic device, when it is determined that the temporary IP address is not the same as the IP address of said another electronic device;

generating, when it is determined by the determining step that the temporary IP address is the same as the IP address of said another electronic device, another interface identifier by using the local interface identifier unit for a pre-determined number of attempts, the another interface identifier being generated by the local interface identifier unit using a MAC address of the electronic device in which values excluding FFFE are inserted between high 24 bits and low 24 bits;

generating, when the pre-determined number of attempts is reached, the another interface identifier by using the server based identifier management generating unit.

9. The IP address generating method as claimed in claim 8, wherein the interface identifier is generated using a hash function.

10. The IP address generating method as claimed in claim 8, wherein the interface identifier is generated using a server provided outside the electronic device.

11. The IP address generating method as claimed in claim 8, wherein the interface identifier is generated using a MAC address of the electronic device in which values in a special address range for a vendor are changed.

12. The IP address generating method as claimed in claim 8, wherein the interface identifier is generated using a MAC address of the electronic device in which values in a range not assigned to hardware by a vendor are changed.

13. The IP address generating method as claimed in claim 8, wherein the interface identifier is generated according to an interface identifier generating method selected by a user.

14. The IP address generating method as claimed in claim 8, wherein the IP address is any one of a link local address, a stateless address, and a stateful address.

15. A computer-readable storage medium having stored therein an IP address generating program that when executed by a computer performs a method comprising:

generating the interface identifier using a server based identifier management generating unit or a local interface identifier unit;

generating a temporary IP address containing the interface identifier, generated in the generating an interface identifier step, and a prefix;

determining whether the temporary IP address, generated in the generating a temporary IP address step, is the same as an IP address of another electronic device; and specifying the temporary IP address as the IP address of the electronic device, when it is determined in the determining step that the temporary IP address is not the same as the IP address of said another electronic device;

generating, when it is determined that the temporary IP address is the same as the IP address of said another electronic device, another interface identifier by using the local interface identifier unit for a pre-determined number of attempts, the another interface identifier being generated by the local interface identifier unit using a MAC address of the electronic device in which values excluding FFFE are inserted between high 24 bits and low 24 bits;

generating, when the pre-determined number of attempts is reached, the another interface identifier by using the server based identifier management generating unit.

* * * * *